United States Patent
Valva et al.

(10) Patent No.: US 9,739,173 B2
(45) Date of Patent: Aug. 22, 2017

(54) GAS TURBINE LUBRICATION SYSTEMS

(71) Applicant: UNITED TECHNOLOGIES CORPORATION, Farmington, CT (US)

(72) Inventors: Christopher M. Valva, Manchester, CT (US); Todd M. Lapierre, Middleton, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 107 days.

(21) Appl. No.: 14/500,123

(22) Filed: Sep. 29, 2014

(65) Prior Publication Data

US 2015/0089918 A1  Apr. 2, 2015

(51) Int. Cl.
*F01D 25/20* (2006.01)
*F02C 7/36* (2006.01)
*F01M 11/02* (2006.01)

(52) U.S. Cl.
CPC .............. *F01D 25/20* (2013.01); *F02C 7/36* (2013.01); *F01M 11/02* (2013.01); *F05D 2260/40311* (2013.01)

(58) Field of Classification Search
CPC . F01D 25/20; F02C 7/36; F01M 11/02; F05D 2260/40311

USPC .......... 475/159; 60/39.08, 792, 262
See application file for complete search history.

(56) References Cited

U.S. PATENT DOCUMENTS

| | | | | |
|---|---|---|---|---|
| 3,489,338 A | * | 1/1970 | Davies | F01D 7/00 416/157 R |
| 5,472,383 A | * | 12/1995 | McKibbin | F16H 57/0482 184/6.12 |
| 7,490,460 B2 | * | 2/2009 | Moniz | F02C 3/067 415/9 |
| 2011/0108360 A1 | * | 5/2011 | DiBenedetto | F01D 25/18 184/6.11 |
| 2012/0257960 A1 | * | 10/2012 | Reinhardt | F01D 25/162 415/122.1 |
| 2013/0023378 A1 | * | 1/2013 | McCune | F16H 57/082 475/344 |

* cited by examiner

*Primary Examiner* — Steven Sutherland
(74) *Attorney, Agent, or Firm* — Cantor Colburn LLP

(57) ABSTRACT

A casing for a fan drive gear system includes a cast body with an upper and a lower portion. The cast body defines an oil inlet and an oil outlet arranged below the oil outlet. An integrally cast oil channel extends between the inlet and outlet for conveying oil from the upper portion of the cast body portion to the lower portion of the cast body for providing a supply of lubrication to the gear system when oil pools in an upper portion of an auxiliary oil reservoir during negative-G flight events.

20 Claims, 4 Drawing Sheets

GAS TURBINE LUBRICATION SYSTEMS

CROSS-REFERENCE TO RELATED APPLICATION

This application claims the benefit of priority under 35 U.S.C. §119(e) to U.S. Provisional Application No. 61/885,310, filed Oct. 1, 2013, which is incorporated herein by reference in its entirety.

BACKGROUND OF THE INVENTION

1. Field of the Invention

The present disclosure relates to lubrication systems for gas turbine engines, and more particularly to lubrication systems for fan drive gear systems in gas turbine engines.

2. Description of Related Art

Many conventional gas turbines include a low-pressure spool and a high-pressure spool. The low-pressure spool includes a low-pressure turbine connected to a low-pressure compressor for driving the low-pressure compressor. The high-pressure spool includes a high-pressure turbine connected to a high-pressure compressor for driving the high-pressure compressor. In some gas turbine engines, a fan forward of the spools is connected to the low-pressure spool through a fan drive gear system. A main supply pump supplies lubricating liquid to the fan drive gear system under most operating conditions, and an auxiliary supply pump supplies lubricating liquid to the fan drive gear system under other operating conditions. The auxiliary supply pump connects to an auxiliary reservoir through a conduit routed within a case housing the fan drive gear system. The conduit typically includes two or more conduit segments, mounting hardware, and associated fittings for purposes of securing the conduit within the case housing the fan drive gear system.

Conventional oil scavenging systems have generally been satisfactory for their intended purpose. However, there is a need for improved lubrication systems with fewer parts and which require less assembly time than conventional lubrication systems. There also remains a need for lubrication systems that are lightweight and less costly than conventional systems. The present disclosure provides solutions to these needs.

SUMMARY OF THE INVENTION

A casing for a fan drive gear system includes a cast body with an upper and a lower portion. The cast body defines an oil inlet and an oil outlet, the oil outlet arranged below the oil inlet. An integrally cast oil channel extends between the inlet and outlet for conveying oil from the upper portion of the cast body portion to the lower portion of the cast body, thereby providing a supply of lubrication to the gear system when oil pools in an upper portion of an auxiliary oil reservoir during negative-G flight events.

In certain embodiments, the casing includes an inlet strainer coupled to the oil inlet. The cast body can define an overflow port fluidly connected to the auxiliary oil reservoir. The oil inlet strainer can be arranged below the overflow port so as to draw in oil when the oil level in the auxiliary oil reservoir is below the overflow port for keeping air out of the lubrication system. The cast body can define a gutter inlet fluidly coupled to the fan drive gear system for providing oil to the auxiliary oil reservoir. The oil inlet can also be laterally offset and below the gutter inlet for limiting entrained air in oil entering the oil inlet.

In accordance with certain embodiments, the cast body includes a machined axial surface proximate the oil inlet. The cast body can include a machined axial surface proximate the oil outlet. Either or both the axial surfaces can be orthogonal with respect to an axis of the cast body. A main oil pump and a shuttle valve can be fluidly connected to the main and auxiliary oil pump, the shuttle valve configured to fluidly couple the pump to the fan drive gear system upon detecting low main oil pump pressure.

It is contemplated that the oil inlet and the oil outlet are located on an interior face of the cast body. The oil channel can be an arcuate path about an exterior face of the cast body. The oil channel can protrude forward of an exterior face of the cast body. The inlet strainer can be coupled to the oil inlet and positioned in a quiet area proximate an inlet to the auxiliary oil reservoir for limiting entrained air in oil flowing through the oil channel.

A lubrication system for a fan drive gear system is also provided. The lubrication system includes a casing as described above. The system also includes an auxiliary oil reservoir bounded by a circumferentially extending face of the casing and an auxiliary oil pump mounted to the face of the casing. A transfer tube is fluidly connecting the oil outlet fluidly connecting the oil auxiliary pump with the auxiliary oil reservoir.

A geared turbofan engine is additionally provided. The geared turbofan include a housing with a casing as described above and an auxiliary oil reservoir disposed in an upper portion of the housing. A fan drive gear system is operatively disposed within the housing and a gutter for collecting oil is arranged about the gear system. The auxiliary oil reservoir is configured to supply oil for lubricating the fan drive gear system during negative-G flight events by flowing oil through the oil channel between the oil inlet and oil outlet.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2:
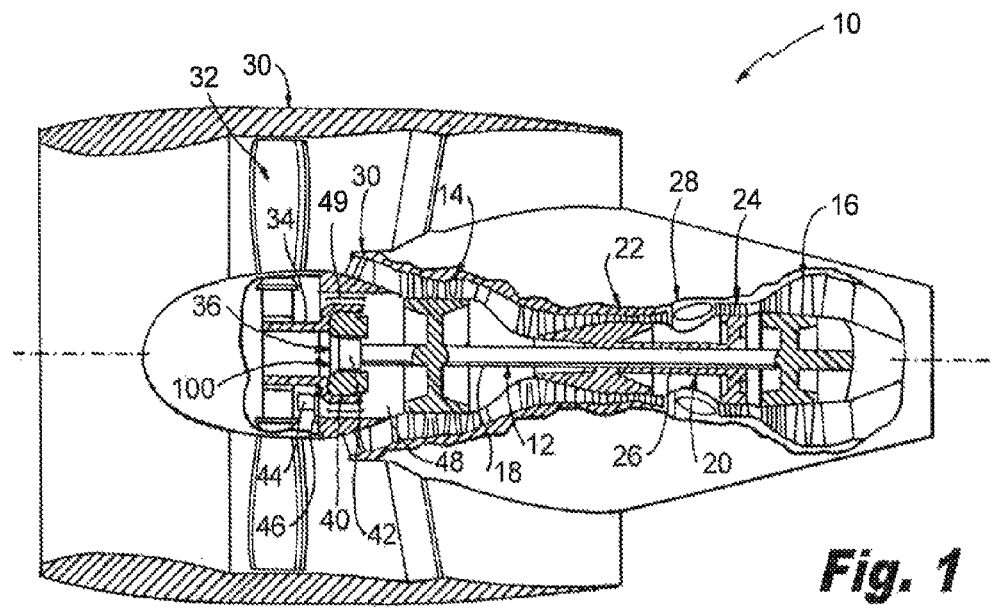
FIG. 1 is a schematic cross-sectional side view of a gas turbine engine constructed in accordance with the present disclosure, showing a fan drive gear lubrication system.
FIG. 2 is a schematic cross-sectional side view of the lubrication system of FIG. 1, showing the fan drive gear system, oil pumps, and oil passages.

Reference will now be made to the drawings wherein like reference numerals identify similar structural features or aspects of the subject disclosure. For purposes of explanation and illustration, and not limitation, a partial view of an exemplary embodiment of a gas turbine engine in accordance with the disclosure is shown in FIG. 1 and is designated generally by reference character 10. Other embodiments of the turbofan engine in accordance with the disclosure, or aspects thereof, are provided in FIGS. 2-5, as will be described. The systems and methods described herein can be used in turbofan engines, such as turbofan engines having a fan drive gear system (FDGS) for example.

Gas turbine engine 10 includes a low-pressure spool 12 (which includes a low-pressure compressor 14 and a low-pressure turbine 16 connected by a low-pressure shaft 18), a high-pressure spool 20 (which includes high-pressure compressor 22 and a high-pressure turbine 24 connected by a high-pressure shaft 26), a combustor 28, a nacelle 30, a fan 32, a fan shaft 34, and a FDGS 36 (which includes a star gear 38, a ring gear 40, and a sun gear 42). Low-pressure spool 12, high-pressure spool 20, fan shaft 34, and FDGS 36 all rotate substantially about an engine axis A. The general construction and operation of gas turbine engines is well-known in the art, and therefore detailed discussion here is unnecessary.

Low-pressure spool 12 is coupled to fan shaft 34 via FDGS 36. As illustrated, FDGS 36 is a "star gear system". Sun gear 42 is attached to and rotates with low-pressure shaft 18. Ring gear 40 is rigidly connected to fan shaft 34 which rotates at the same speed as fan 32. Star gear 38 is coupled between sun gear 42 and ring gear 40 such that star gear 38 revolves about its axis, when sun gear 42 rotates. When low-pressure spool 12 rotates, FDGS 36 causes fan shaft 34 to rotate at a slower rotational velocity than that of low-pressure spool 12. This allows fan 32 and low-pressure spool 12 to rotate at different speeds for improved operation of both fan 32 and low-pressure spool 12. In an alternative embodiment, fan drive gear system 36 can be a "planetary gear system". In a planetary gear system, ring gear 40 is fixed and fan shaft 34 is attached to a carrier (not shown) that carries star gear 38 (also called a planet gear). Star gear 38 orbits about sun gear 42 as it spins between sun gear 42 and ring gear 40.

With reference to FIG. 2, a lubrication system 100 for FDGS 36 is shown. Lubrication system 100 bearing compartment 102 defined by a cast body 104 (shown in FIG. 3) that contains FDGS 36 (including journal bearings 54), auxiliary pump 106, a gutter system 108 (including a gutter 110 and an auxiliary tank fill tube 140), and an auxiliary reservoir 114. Lubrication system 100 also includes a main reservoir 116, main lubricating liquid pump 118 (main pump), and scavenge lubricating liquid pump 120 (scavenge pump) positioned outside of bearing compartment 102.

Auxiliary lubricating liquid pump 106 (auxiliary pump) is coupled to and is driven by fan shaft 34 via pump gear 46 (shown in FIG. 1) such that auxiliary pump 106 can operate whenever fan shaft 34 (shown in FIG. 1) is rotating. Auxiliary pump 106 is a two-stage pump that supplies a lubricating liquid, such as oil (as will be referenced herein), to lubricate components such as gears and bearings of FDGS 36. FDGS 36 benefits from a relatively continuous supply of lubricating liquid whenever fan shaft 34 is rotating. Gutter system 110 is positioned circumferentially around FDGS 36 to catch and collect a portion of the lubricating liquid that drips or is slung off FDGS 36, as further explained below. At least some of the lubricating liquid supplied to FDGS 36 drains to a sump 122 arranged in a lower portion of bearing compartment 102, and is eventually pumped back through auxiliary pump 106. Passages 124, 126, 128, 130, 132, 134, 136, 138, and 140 connect the various components as illustrated and as further described, below.

As FDGS 36 spins, lubricating liquid drips or is slung off FDGS 36 into bearing compartment 102 in different directions, illustrated by arrows A. A portion of that liquid is caught and collected by gutter 110 and funneled to auxiliary reservoir 114, entering auxiliary reservoir 114 at an auxiliary reservoir gutter inlet 115. During normal operating conditions, auxiliary reservoir 114 is kept substantially full of lubricating liquid for later use, advantageously potentially containing sufficient volume of lubricating liquid to provide adequate lubrication for FDGS 36 for a predetermined period of time. Lubricating liquid in excess of that required by auxiliary reservoir 114 is delivered to an overflow passage 140, at an overflow passage inlet 141, and ultimately to main scavenge passage 136. A portion of lubricating liquid slung from FDGS 36 is not captured by gutter 110 and is distributed within bearing compartment 102 as indicated by arrows B, ultimately collecting in sump 122, which is an open-top reservoir at a bottom of bearing compartment 102. Bearing compartment 102 can be sealed to reduce liquid flow out of bearing compartment 102, except through designated passages as herein described.

A shuttle valve 142 is fluidly connected to auxiliary pump 106 via passage 134, to main pump 118 via passage 126, to journal bearings 54 via passage 128, and to main reservoir 116 via passages 137 and 138. Shuttle valve 142 selectively directs fluid flow from auxiliary pump 106 or main pump 118 to journal bearings 54. Main reservoir 116 is further connected to main pump 118 through passage 124. Scavenge pump 120 is connected to sump 122 via main scavenge passage 136 and to main reservoir 116 via passage 138. Scavenge pump 120 pumps a portion of the lubricating liquid in sump 122 to main reservoir 116 for use by main pump 118. The function shuttle valves is described in U.S. patent Ser. No. 12/470,823 entitled "WINDMILL AND ZERO GRAVITY LUBRICATION SYSTEM", filed on May 22, 2009, the contents of which are incorporated herein by reference in its entirety.

Shuttle valve 142 is configured and adapted to connect to one of the auxiliary pump 106 and the main pump 118 to bearing compartment 102 for providing lubricant liquid to journal bearings 54. Auxiliary pump 106 is in turn connected to auxiliary reservoir 114 via an auxiliary passage 130, to sump 122 via passage 132, and shuttle valve 142 via passage 134. Main pump 118 connects to main reservoir 116 through passage 124. Shuttle valve 142 directs lubricating liquid to journal bearings 54 from at least one of sump 122, auxiliary reservoir 114, or main reservoir 116. When engine operating conditions prevent main pump 118 from supplying adequate lubricating liquid, shuttle valve 142 switches from main pump 118 (connected through passage 126) to auxiliary pump 106 (through passage 134).

During normal operating conditions, i.e. when gravity is oriented downward with respect a normal orientation of gas turbine engine 10, auxiliary pump 106 pulls lubricating liquid from both sump 122 and auxiliary reservoir 114. When wind milling, and auxiliary reservoir 114 is empty, auxiliary pump 106 pulls lubricating liquid from only sump 122. During negative-G flight events, e.g. when gravity is oriented upwards with respect to the normal orientation of gas turbine engine 10, lubricating liquid moves from sump 122 to the upper reaches of bearing compartment 102. Under such circumstances, auxiliary pump 106 draws lubricating liquid from auxiliary reservoir 114 through auxiliary passage 130 using a pickup 144 (shown in FIG. 3) disposed within auxiliary reservoir 114. Auxiliary pump 106 and shuttle valve 142 thereby provide a flow of lubricating liquid to journal bearings 54 when sufficient lubricating liquid is unavailable from main pump 118 under both normal operating conditions and during negative-G events using lubricating liquid from auxiliary reservoir 114.

Figure 3A:
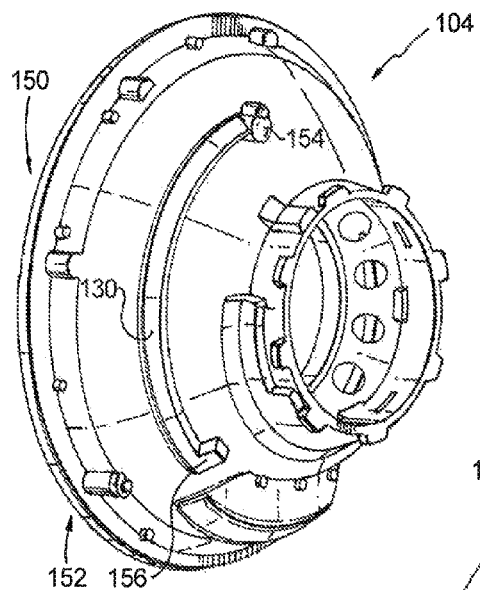
FIG. 3A is an aft perspective view a cast body of the lubrication system of FIG. 1, showing interior features of the cast body.

With reference to FIG. 3A, cast body 104 is shown. Cast body 104 is a casing for a FDGS and includes with an upper portion 150 and a lower portion 152. Cast body 104 defines an oil inlet 154 and an oil outlet 156, oil outlet 156 being arranged below oil inlet 154. An integrally cast auxiliary oil channel forms passage 130 and extends between oil inlet 154 and oil outlet 156 for conveying oil from upper portion 150 to lower portion 142 of cast body 104. Oil channel 130 is cast into a forward face of cast body 104 and forms an arcuate segment tracing a circumferential segment about the forward face of cast body 104.

Figure 3B:
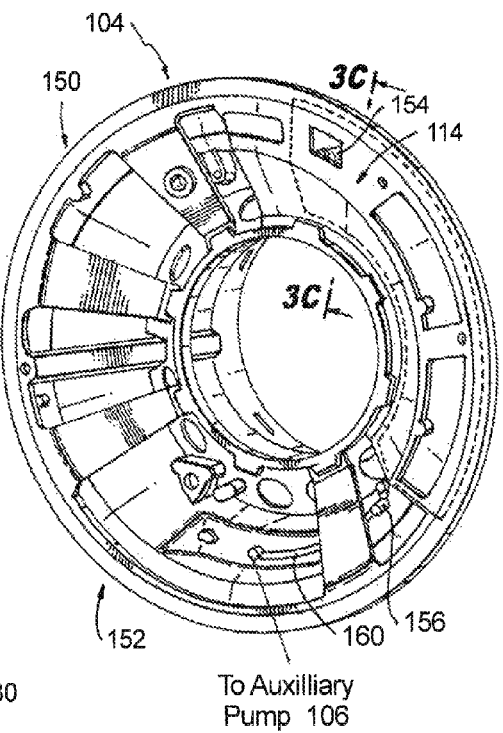
FIG. 3B is a forward perspective view of the cast body of FIG. 1, showing exterior features of the cast body.

With reference to FIG. 3B, oil inlet 154 and oil outlet 145 respectively form apertures disposed on an aft face of case body 104. Oil inlet 154 is configured to receive an inlet screen 158 extending longitudinally aft wise from oil inlet 154. Inlet screen 158 can be radial screen or perforated sheet having a cap disposed on its aft end, for example. Oil inlet 154 and inlet screen 158 are disposed within auxiliary reservoir 114 (shown in dashed outline in FIG. 3B), cast body bounding a portion of auxiliary reservoir 114. Auxiliary reservoir 114 defines a volume for containing a predetermined amount for oil for providing lubricating liquid to FDGS 34. Auxiliary oil reservoir 114 is fluidly coupled at its top to overflow passage 140, gutter inlet 115, and oil inlet 154 for providing a supply of lubrication to the gear system when oil pools in an upper portion of an auxiliary oil reservoir during negative-G flight events. A transition conduit 160 connects between oil outlet 156 and auxiliary pump 106 (shown in FIG. 2) for purposes of connecting auxiliary oil tank 114 to auxiliary pump 106.

Figure 3C:
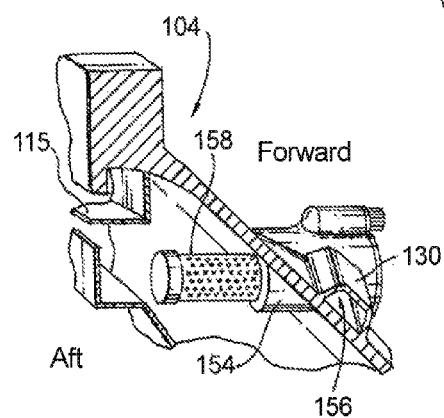
FIG. 3C is cross-sectional side view of the cast body of FIG. 1, showing the oil strainer, oil inlet, and integrally cast oil channel.

With reference to FIG. 3C, a portion of cast body 104 is shown in cross-section. Oil inlet 154 is disposed on an interior face of cast body 104 facing aft. Inlet screen 158 is connected to oil inlet 158 and extends aft-wise therefrom. Forward of oil inlet 154, a raised segment including a cover, interior o-ring and securing fastener provides access to lubrication system 100 from the forward face of cast body 104. Oil channel 130 fluidly couples to oil inlet 154 through the raised segment. Auxiliary reservoir gutter inlet 115 is disposed above and laterally offset with respect to inlet screen 158, thereby positioning inlet screen 158 out of direct flow from gutter inlet 115 and out of direct flow from oil entering auxiliary oil reservoir 114 (shown in FIG. 5A). This has the potential advantage of placing oil inlet 154 is a "quiet area" such that oil entering oil channel 130 has the least amount of entrained air, thereby improving efficiency of lubrication system 100.

Figure 4A:
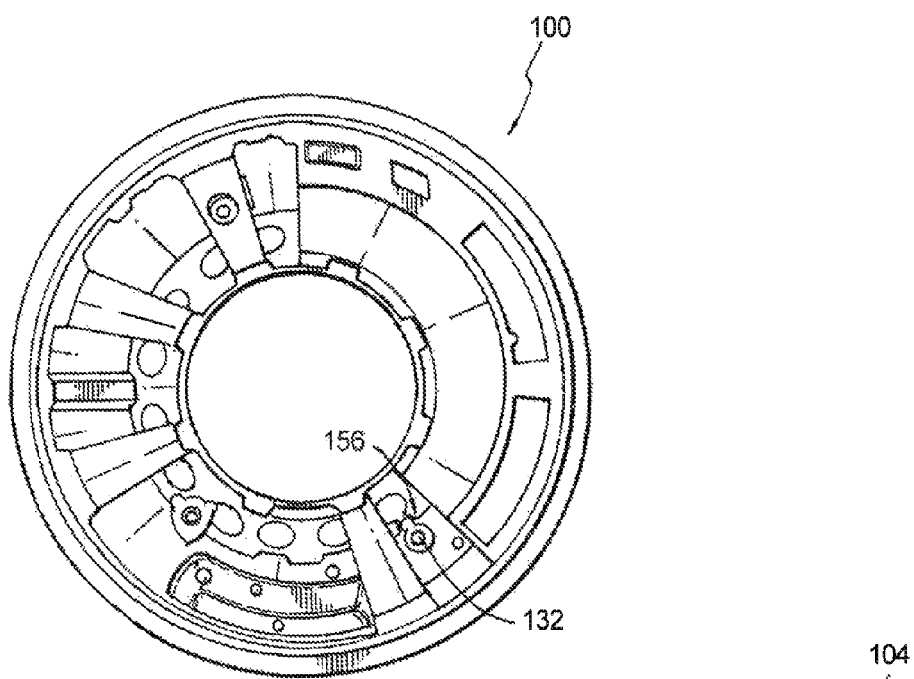
FIG. 4A is an aft end view of the cast body of FIG. 1, showing an axial machined surface proximate the outlet port of the cast body.
Figure 4B:
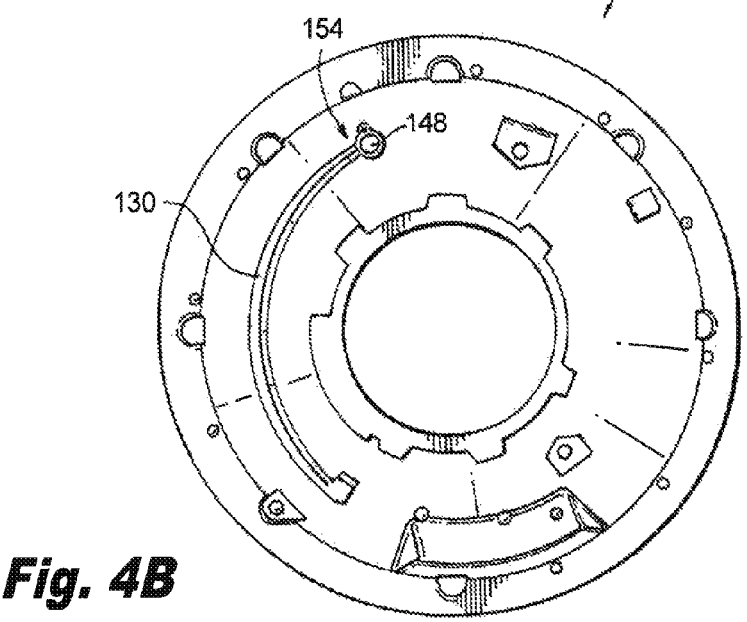
FIG. 4B is a forward end view of the cast body of FIG. 1, showing an axial machined surface proximate the inlet port of the cast body.

With reference to FIG. 4A, cast body 104 includes an axial surface 146 suitable for machining, proximate to oil channel 130, and located adjacent an oil outlet end of auxiliary passage 130. Machined axial surface 146 is substantially orthogonal with respect to the centerline (shown in FIG. 1) of gas turbine engine 10. With reference to FIG. 4B, cast body 104 also includes an axial surface 148 suitable for machining on an opposite side, e.g. the forward face, of cast body 104, adjacent an inlet end of auxiliary passage 130. Axial surfaces 146 and 148 are arranged for axial machining for formation of oil inlet 154 and outlet 156, such as by axially milling out axial surface 146 through cast body 104 and by axially milling axial surface 148 to within distance of auxiliary passage 130 such that a fitting can fluidly connected with auxiliary passage 130. This has the potential advantage of simplifying the manufacture of cast body 104 by allowing for creation of oil inlet 154 and oil outlet 156 with axial machining, and without requiring use of a relative complex (and costly) five axis milling machine.

Figure 5A:
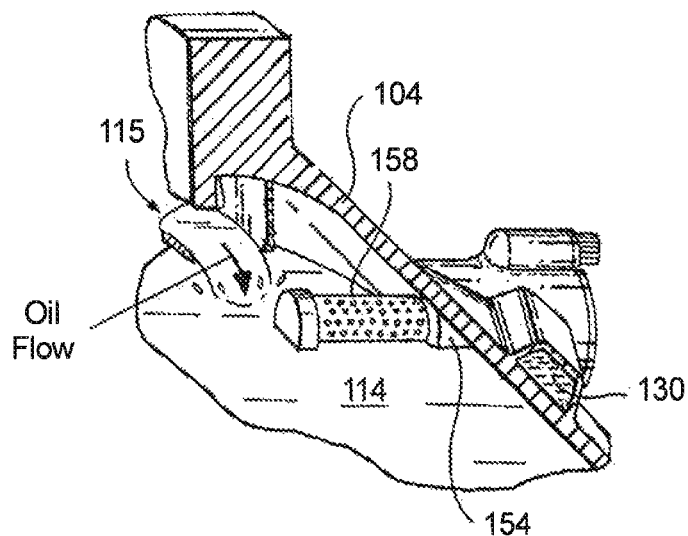
FIG. 5A is a cross-sectional view of the lubrication system of FIG. 1, showing oil entering the auxiliary oil reservoir laterally with respect to the inlet screen and oil inlet.
Figure 5B:
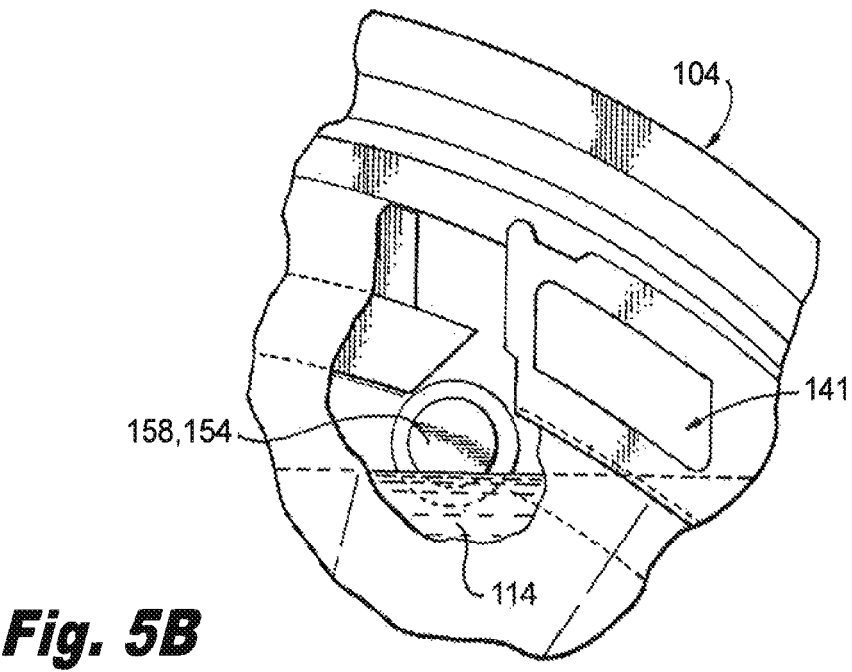
FIG. 5B is an end view of an interior of the lubrication system of FIG. 1, showing a level of oil in the auxiliary reservoir in relation to an overflow port oil channel inlet.

With reference to FIG. 5A, oil is shown entering auxiliary oil tank 114. Oil enters auxiliary oil tank 114 from gutter system 108 (shown in FIG. 2) through auxiliary reservoir gutter inlet 115. Inlet screen 158 is position out of the flow of oil, thereby limiting entrained air in oil entering oil channel 130 through oil inlet 154. With reference to FIG. 5B, inlet screen 158 and oil inlet 154 are arranged vertically with respect of overflow passage inlet port 141 such that, when oil in oil reservoir 114 falls below the lowest point of overflow passage inlet port 141, oil is still able to enter oil channel 130. This keeps oil channel 130 filled with oil, thereby reducing air ingested by lubrication system 100.

Conventional auxiliary oil tubes typically include a perforated tube segment coupled by additional internal tube segments, fittings, and associated hardware. The perforated tube is generally substantially orthogonal with respect to the engine rotation axis. Integrally cast oil channel 130 has the potential advantage of reducing assembly time, cost or weight from engines incorporating the structure by eliminating at least some of the parts (e.g. the perforated tube segment for example) typically incorporated into the auxiliary oil tube structure. Integrally cast oil channel 130 also potentially allows for arranging the oil inlet in an orientation where oil entering oil channel 130 has less entrained air, such as by replacing the perforated tube segment tube with an inlet screen, orienting the screen substantially in parallel with the engine axis, and/or laterally offsetting the screen with respect to the gutter inlet.

The methods and systems of the present disclosure, as described above and shown in the drawings, provide for a gas turbine engine lubrication with superior properties including ease of manufacturability, reduced parts count, and reduced cost. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A casing for a fan drive gear system, comprising:
   a cast body having upper and lower portions, defining:
   an oil inlet;
   an oil outlet arranged below the oil inlet; and
   an integrally cast oil channel extending between the oil inlet and oil outlet;

wherein the integrally cast oil channel is configured to convey oil from the cast body upper portion to the cast body lower portion for lubricating the fan drive gear system of a geared turbofan engine when oil pools in an upper portion of an auxiliary oil reservoir during negative-G flight events.

2. A casing as recited in claim 1, further including an inlet strainer coupled to the oil inlet.

3. A casing as recited in claim 2, wherein the cast body defines an overflow port fluidly connected to the auxiliary oil reservoir.

4. A casing as recited in claim 3, wherein the inlet strainer is arranged below the overflow port so as to draw in oil when an oil level in the auxiliary oil reservoir is below the overflow port for keeping air out of the oil inlet.

5. A casing as recited in claim 1, wherein the cast body defines a gutter inlet fluidly coupled to the fan drive gear system for providing oil to the auxiliary oil reservoir.

6. A casing as recited in claim 5, wherein the oil inlet is laterally offset and below the gutter inlet for limiting entrained air in oil entering the oil inlet.

7. A casing as recited in claim 1, wherein at least one of the oil inlet and the oil outlet includes a machined axial surface.

8. A casing as recited in claim 7, wherein the machined axial surface is orthogonal with respect to an axis of the cast body.

9. A casing as recited in claim 1, wherein the oil inlet and the oil outlet are located on an interior face of the cast body.

10. A casing as recited in claim 1, wherein the oil channel traces an arcuate path about an exterior face of the cast body.

11. A lubrication system for a fan drive gear system, comprising:
a casing, comprising:
a cast body having upper and lower portions, defining:
an oil inlet;
an oil outlet arranged below the oil inlet; and
an integrally cast oil channel extending between the oil inlet and oil outlet;
an auxiliary oil reservoir bounded by a circumferentially extending face of the casing, wherein the integrally cast oil channel is configured to convey oil from the cast body upper portion to the cast body lower portion for lubricating the fan drive gear system of a geared turbofan engine when oil pools in an upper portion of the auxiliary oil reservoir during negative-G flight events;
an auxiliary oil pump mounted to the face of the casing; and
a transfer tube fluidly connecting the oil outlet fluidly connecting the auxiliary oil pump with the auxiliary oil reservoir.

12. A lubrication system as recited in claim 11, further comprising an inlet strainer coupled to the oil inlet and positioned in an area proximate to an inlet to the auxiliary oil reservoir so that entrained air in oil flowing through the oil channel is limited.

13. A lubrication system as recited in claim 11, further comprising a main oil pump and a shuttle valve fluidly connected to the main oil pump and the auxiliary oil pump, the shuttle valve configured to fluidly couple the auxiliary oil pump to the fan drive gear system upon detecting low main oil pump pressure.

14. A geared turbofan engine, comprising:
a housing including a casing, the casing comprising:
a cast body having upper and lower portions, defining:
an oil inlet;
an oil outlet arranged below the oil inlet; and
an integrally cast oil channel extending between the oil inlet and oil outlet;
an auxiliary oil reservoir disposed in an upper portion of the housing;
a fan drive gear system operatively disposed within the housing;
a gutter for collecting oil arranged about the gear system; and
wherein the auxiliary oil reservoir is configured to supply oil from the cast body upper portion to the cast body lower portion for lubricating the fan drive gear system during negative-G flight events by flowing oil through the oil channel between the oil inlet and oil outlet.

15. An engine as recited in claim 14, further including an inlet strainer coupled to the oil inlet.

16. An engine as recited in claim 15, wherein the inlet strainer is positioned in an area proximate to an inlet to the auxiliary oil reservoir so that entrained air in oil flowing through the oil channel is limited.

17. An engine as recited in claim 15, wherein the cast body defines an overflow port fluidly connected to the auxiliary oil reservoir.

18. An engine as recited in claim 17, wherein the inlet strainer is arranged below the overflow port so as to draw in oil when the oil level in the auxiliary oil reservoir is below the overflow port for keeping air out of the oil inlet.

19. An engine as recited in claim 14, wherein the cast body defines a gutter inlet fluidly coupled to the gutter for providing oil to the auxiliary oil reservoir.

20. An engine as recited in claim 19, wherein the oil inlet is laterally offset and below the gutter inlet for limiting entrained air in oil entering the oil inlet.

* * * * *